United States Patent [19]

Ebert et al.

[11] Patent Number: 5,528,586
[45] Date of Patent: Jun. 18, 1996

[54] HIERARCHICAL COMMUNICATION NETWORK AND COMMUNICATION ELEMENT FOR A HIERARCHICAL COMMUNICATION NETWORK

[75] Inventors: Siegfried Ebert, Altdorf; Rudolf Kasseckert, Nürnberg, both of Germany

[73] Assignee: U.S. Philips Corporation, New York, N.Y.

[21] Appl. No.: 303,998

[22] Filed: Sep. 9, 1994

[30] Foreign Application Priority Data

Sep. 17, 1993 [DE] Germany ............................ 43 31 618.2

[51] Int. Cl.$^6$ .................................................. H04J 3/02
[52] U.S. Cl. ....................... 370/58.1; 370/94.3; 395/300
[58] Field of Search ........................... 370/58.1, 16, 85.1, 370/94.1, 94.3, 54, 60, 85.13, 85.14; 340/825.02; 395/200, 325

[56] References Cited

U.S. PATENT DOCUMENTS

| | | | |
|---|---|---|---|
| 4,801,934 | 1/1989 | Herkert | 340/825.020 |
| 5,115,425 | 5/1992 | Ardon | 370/54 |
| 5,172,372 | 12/1992 | Konishi | 370/94.3 |
| 5,295,133 | 3/1994 | Jurkevich | 370/16 |
| 5,381,403 | 1/1995 | Maher et al. | 370/94.3 |

FOREIGN PATENT DOCUMENTS 0537821   4/1993   European Pat. Off. ........ H04L 12/24

OTHER PUBLICATIONS

CCITT Recommendation M.30. 1992.

*Primary Examiner*—Douglas W. Olms
*Assistant Examiner*—Min Jung
*Attorney, Agent, or Firm*—Anne E. Barschall

[57] ABSTRACT

A communication element for a hierarchical management network enhances the reliability of such a network. The communication element features at least 2 interfaces (2, 3) each having an assigned port (7, 8). A connection to communication elements of a higher hierarchical level of the management network can be established via each interface. A further variant of such a communication element features by at least two interfaces (4, 5) to which is assigned a shared port (11) and via each of which a connection to communication elements of a lower hierarchical level can be established. A further variant of a communication element includes features which can be formed from a combination of all the features of the two first variants. Structures of management networks are made possible with the communication elements presented, are explained.

16 Claims, 2 Drawing Sheets

HIERARCHICAL COMMUNICATION NETWORK AND COMMUNICATION ELEMENT FOR A HIERARCHICAL COMMUNICATION NETWORK

The invention relates to a hierarchical communication network and a communication element for this communication network.

In CCITT Recommendation M.30 is described the basic structure of a management network. The CCITT term for such a network is Telecommunication Management Network, abbreviated to TMN.

Important building blocks of the management network are communication elements. Communication elements at the bottom hierarchical level of such a network form the link between the management network and the communication network to be managed and to be monitored. They collect data about the communication network and transfer these data to communication elements of the next higher hierarchical level upon request. They also intervene in the communication network by conveying control and switching commands, for example, for substitute switching measures. In Recommendation M.30 a communication element of the bottom hierarchical level is called a "Network Element" (NE) and a communication element of the other levels is called a "Mediation Device" (MD).

At the top hierarchical level of the communication network are indication, decision and control systems which are called Operations Systems in Recommendation M.30 and are abbreviated to OS. They will be called Main Operations Systems in the following.

In the main operations systems all the data of the network to be managed and monitored are collected and evaluated by computers. If so required, additional measures are automatically taken forthwith.

Concretizations of such management systems are described, for example, in DE 34 36 441 A1 and in a data journal of Philips Kommunikations Industrie AG (SISA "Kommunikationsnetz for Netzmanagement", March 1991). Communication elements according to the state of the art have one port in the up-direction and one port in the down-direction. One physical interface is assigned unambiguously to each port. It is impossible with these communication elements to form connections in various directions.

From EP 05 37 821 can be learned what constructive changes can be made to network management systems used up till then, so that also the monitoring of line structures becomes possible. Especially in EP 05 37 821 there are provided standardized interfaces via which signals are transmitted to a higher or lower hierarchical level to extend a controllable change-over switch. The controllable changeover switch is arranged in the down-line of the interface or in the down-line of the assigned communication element, respectively. In the position of "transmission" the switch connects the communication element to a transmission line and interrupts the transmission line, so that all subsequent communication elements—seen against the direction of transmission—are separated from the transmission line. In the position of "no transmission" the changeover switch separates the assigned communication element from the transmission line and simultaneously terminates the interruption of the transmission line. If interfaces are discussed in the following, via which the signals pass to a higher or lower-order hierarchical level, interfaces are meant to be understood which are extended by the change-over switches described above.

In communication networks in sparsely populated areas, but also in communication networks of railways or energy supply services, which are arranged mainly line-shaped, there is a requirement to manage the communication network independently from two main operation systems.

It is an object of the invention to provide a communication network which makes such a management possible in a cost-effective way. A further object consists of providing structures of management systems in which such a communication element can be used to advantage.

This object is achieved by utilizing a communication element in which it is possible, via at least two interfaces which have each an assigned port, to establish one connection each to communication elements of a higher hierarchical level.

A further solution consists of a common element by which it is possible to establish via at least two interfaces with one shared port one connection each to communication elements of a lower hierarchical level.

A third solution consists of the combination of all the characteristic features of the first two solutions.

An advantageous embodiment for all the communication elements is formed in that those interfaces via which a connection to communication elements of the same hierarchical level can be established correspond to each other as regards construction and functioning.

With the communication elements specified above it is possible to form a management network in which there are at least two mutually independent connections between communication elements of two different hierarchical levels.

The invention will be further explained with reference to the drawing Figures, in which.

Figure 1:
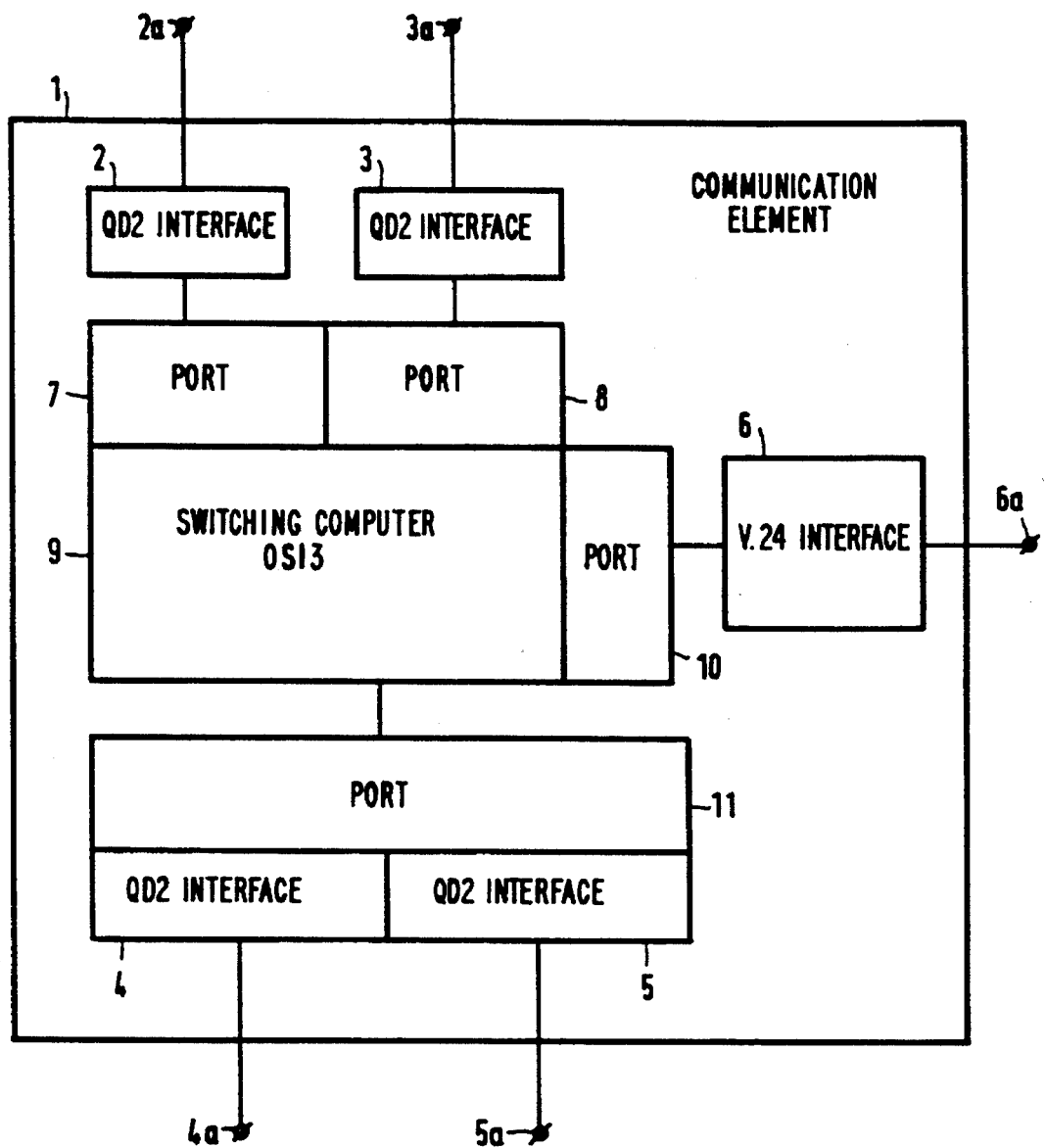
FIG. 1 shows a communication element according to the invention.

The communication element 1 in the embodiment shown in FIG. 1 is connected to its environment via five interfaces 2, 3, 4, 5 and 6. The interfaces 2, 3, 4 and 5 are QD2 interfaces and the interface 6 is a V.24 interface. Via the interfaces 2 and 3 the communication element 1 is connected to building blocks of a higher hierarchical level of the management network and via the interfaces 4 and 5 to building blocks of a lower hierarchical level. Via the interface 6 there is a connection to a personal computer (not shown).

Central function unit of the communication element 1 is a switching computer 9 (called OSI 3 in M.30). It analyses incoming electronic message which contain in the so-termed electronic message headers the addresses of the building blocks of the management network for which the subsequent contents of the electronic message are intended. The addresses in the electronic message header—the destination addresses—may also contain the addresses of intermediate stations (for example, the addresses of ports) via which the electronic message is to travel before it has reached its ultimate destination. The destination information is at any rate so unambiguous (cf. in this context CCITT Recommendation M.30) that the switching computer can decide through which of its ports 7, 8, 10 or 11 an incoming electronic message can be transported. It is then not excluded that a electronic message is to be transported simultaneously through a plurality of ports.

If the address of the next destination of a electronic message is final, this address is appended as a source address to the end of the electronic message so that, as required, the route can be reconstructed via which the electronic message has reached its final destination.

After a electronic message has arrived, the switching computer 9 determines—as was shown above—as a next destination address the address of one or more of its ports 7, 8, 10 or 11. The electronic message are buffered in so-termed queues which are assigned to the ports. As each of the ports 7, 8 and 10 has its own interface, the port address likewise determines via which one of the terminals 2A, 3A and 6A an outgoing electronic message leaves or via which terminals an incoming telegram has arrived.

It is a different matter with the addressable port 11 to a lower-order hierarchical level of the management network. The two interfaces 4 and 5 are connected to this port. Outgoing electronic message are transferred both via the interface 4 and via the interface 5 without additional information i.e. they are transferred both via the terminal 4a and also, in identical form, via the terminal 5a.

With incoming electronic message the switching computer 9 cannot recognize whether a electronic message has arrived over the terminal 4a or over the terminal 5a.

Figure 2:
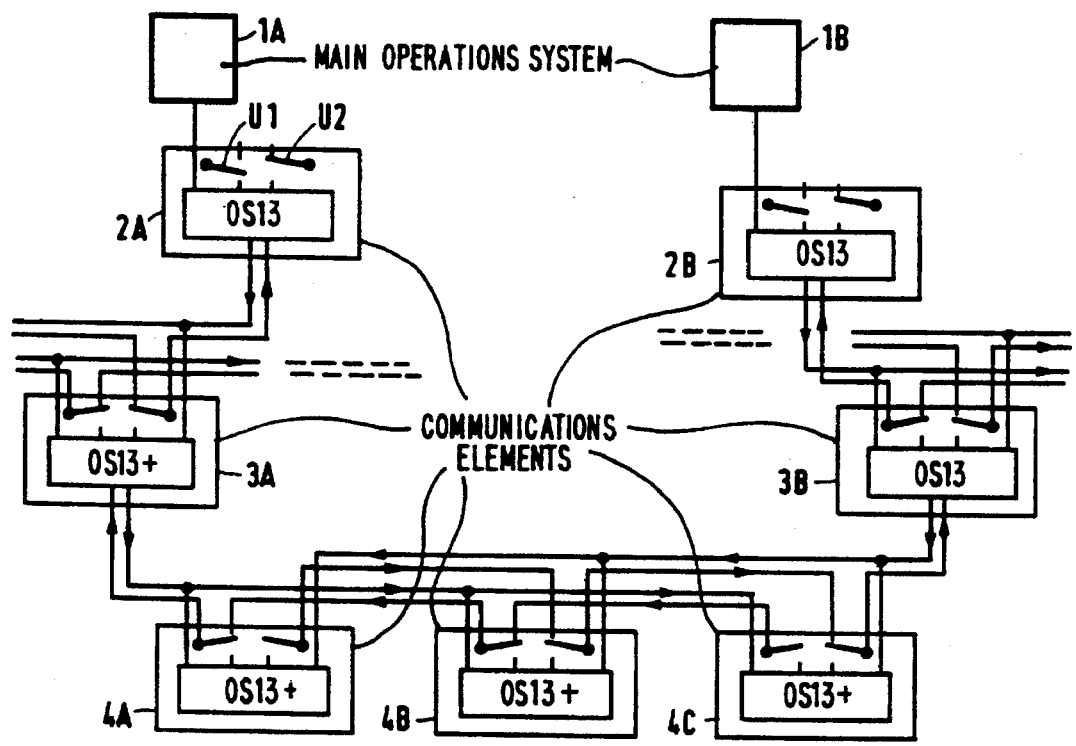
FIG. 2 shows a first structure of a management network with communication elements according to the invention.

FIG. 2 shows the basic circuit diagram of a management network which manages a communication network from two main operations systems 1A and 1B. The communication elements 2A to 4C used have each two interfaces to the higher hierarchical level and one interface for connections to a lower hierarchical level. As the embodiment shown provides the monitoring of a line-formed communication network, also above-mentioned controllable change-over switches are shown explicitly, because only they make it possible to monitor line structures (compare in this context EP 0 537 821).

For clarity, only the change-over switches U1 and U2 carry references. The change-over switches shown are in a state of rest. The communication elements 4A, 4B and 4C may be triggered both via the (higher-order) communication element 3A and via the (higher-order) communication element 3B. They can thus also be triggered via the communication elements 2A and 2B from the two main operations systems 1A and 1B. Seen in the direction from the main operations systems 1A and 1B this is possible from a specific hierarchical level—in the example the level in which the communication elements 4A, 4B and 4C are situated—each communication element can be reached from either main operations system 1A or 1B and even without any constraint. The communication between the main operations system 1A and its communication elements that can be reached is effected via the first interface (interface 2 shown in FIG. 1) of the communication elements, and the communication between the main operations system 1B and its communication elements that can be reached is effected via the second interface (interface 3 shown in FIG. 1). Spontaneous information from communication elements downstream of the communication elements 4A to 4C are switched by the assigned switching computers 9 (FIG. 1) to the two ports 7, 8 (FIG. 1) and thus reach the two main operations systems 1A and 1B.

For neither of the main operations systems the switching information from and to the network element (NE) is changed. Even the configuration may be the same for the two, so that an exchange of information between the operations systems in the case of a disturbance can be effected with a minimum of potential misunderstandings. The two-fold arrangement of this complete TM network is avoided by communication elements shown in FIG. 1.

A structure shown in FIG. 2 is also outstanding because of its reliability. For example, if the line of the TM network between the communication elements 4B and 4C is interrupted, the whole TM network nevertheless remains capable of functioning while the exchange of information between the communication element 4C and the main operations system 1B may be continued. The same holds for the communication elements 4A and 4B as well as for the main operations system 1A.

Figure 3:
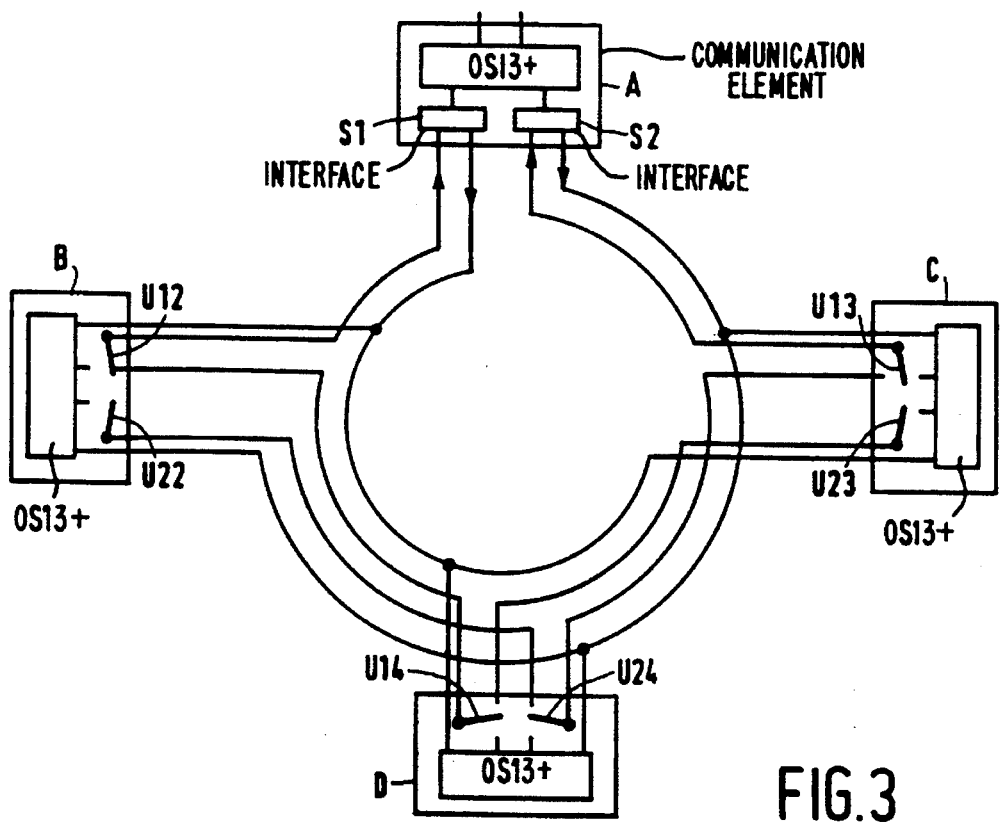
FIG. 3 shows a further structure of a management network.

The reliability can also be applied to the ring structure shown in FIG. 3. This structure comprises three communication elements B, C and D of which each element contains two interfaces to a higher hierarchical level, and one communication element A contains two interfaces to a lower hierarchical level. Since the change-over switches of the interfaces are of the utmost importance to the communication elements B, C and D, they are again explicitly shown, now in a state of rest. In all further interfaces the change-over switches are brought to a state in which there is no functional distinction between an interface with or without a change-over switch; and therefore they are not shown.

As shown in FIG. 3 the communication elements B, C and D are connected via their first interfaces—of which only the assigned change-over switches U12, U13 and U14 are shown—to the first interface S1 of the communication element A. The same holds for the second interfaces of the communication elements B, C and D containing change-over switches U22, U23 and U24 and for the second interface S2 of the communication element A. The exchange of information between the communication element A and the communication elements B, C and D may thus be effected via two independent routes; therefore the TM network remains fully reliable if one of these communication routes has a breakdown due to a defect. Here too it is not necessary to double the TM network completely to guarantee a high reliability.

We claim:

1. Hierarchical communication network with a communication element, the communication element comprising at least first and second interfaces (2,3) for establishing connections to a higher hierarchical level;

at least first and second assigned ports (7,8), each respective assigned port being assigned to a respective one of the first and second interfaces;

at least third and fourth interfaces (4,5) for communicating with a lower hierarchical level;

one shared port (11) assigned to the third and fourth interfaces.

2. The network of claim 1 wherein the first and second interfaces are of a same type.

3. The network of claim 2 wherein the same type is a QD2 interface.

4. The network of claim 1 wherein the third and fourth interfaces are of a same type.

5. The network of claim 4 wherein the same type is a QD2 interface.

6. The network of claim 1 wherein the communication element further comprises a switching computer which communicates with the first and second interfaces via the first and second ports and which communicates with the third and fourth interfaces via the shared port.

7. The network of claim 6 further comprising at least one further port; and at least one further interface for coupling with a PC, so that the switching computer communicates with the PC via the further port and the further interface.

8. The network of claim 7 wherein the further interface is a v.24 interface.

9. Communication element comprising at least first and second interfaces (2,3) for establishing connections to a higher hierarchical level;

at least first and second assigned ports (7,8), each respective assigned port being assigned to a respective one of the first and second interfaces;

at least third and fourth interfaces (4,5) for communicating with a lower hierarchical level;

one shared port (11) assigned to the third and fourth interfaces.

10. The element of claim 9 wherein the first and second interfaces are of a same type.

11. The element of claim 10 wherein the same type is a QD2 interface.

12. The element of claim 9 wherein the third and fourth interfaces are of a same type.

13. The element of claim 12 wherein the same type is a QD2 interface.

14. The element of claim 9 wherein the communication element further comprises a switching computer which communicates with the first and second interfaces via the first and second ports and which communicates with the third and fourth interfaces via the shared port.

15. The element of claim 14 further comprising at least one further port; and at least one further interface for coupling with a PC, so that the switching computer communicates with the PC via the further port and the further interface.

16. The element of claim 15 wherein the further interface is a v.24 interface.

* * * * *